IMPULSE CIRCUIT INCLUDING A STEP-RECOVERY DIODE

Filed Sept. 22, 1965

KEY: = STEP RECOVERY DIODE

INVENTORS
ROBERT D. HALL
STEWART M. KRAKAUER
BY
Q. C. Smith
ATTORNEY

United States Patent Office 3,374,416
Patented Mar. 19, 1968

3,374,416
IMPULSE CIRCUIT INCLUDING A STEP-RECOVERY DIODE

Robert D. Hall, Los Altos, and Stewart M. Krakauer, Palo Alto, Calif., assignors to Hewlett-Packard Company, Palo Alto, Calif., a corporation of California Filed Sept. 22, 1965, Ser. No. 489,311
4 Claims. (Cl. 321—69)

ABSTRACT OF THE DISCLOSURE

An impulse generating circuit includes a step recovery diode which produces impulses having rise and fall times which are adjustable over a wide range down to values of the order of 100 picoseconds or less. A circuit of this type in conjunction with external circuitry may be used as a harmonic generator having a conversion efficiency which closely approaches unity.

Accordingly it is an object of the present invention to provide an improved pulse generating circuit using a step recovery diode.

It is another object of the present invention to provide an improved pulse circuit which operates to transfer unidirectionally to a utilization circuit substantially the total input energy for high operating efficiency.

It is still another object of the present invention to provide an improved pulse generating circuit which produces an output pulse having independently variable rise and fall times.

In accordance with the illustrated embodiment of the present invention, a step recovery diode is connected to receive a driving signal through an inductor. A load circuit, which may include lumped or distributed reactive elements, is connected to receive the signal across the step recovery diode. The step recovery diode is operated in a mode in which the period of nonconduction is only a small portion of the total period of a cycle of the driving signal and in which such period of nonconduction ends substantially at the beginning of the forward biasing portion of the cycle of driving signal. Thus, energy stored by the inductor in the circuit which applies the driving signal to the step recovery diode during its forward conduction period is then transferred to a utilization or load circuit during the short period of diode nonconduction. Energy in the load circuit thus cannot transfer back into the driving circuit because the step recovery diode is biased to forward conduction immediately following the period of nonconduction.

Other and incidental objects of the present invention will be apparent from a reading of this specification and an inspection of the accompanying drawing in which.

Figure 1:
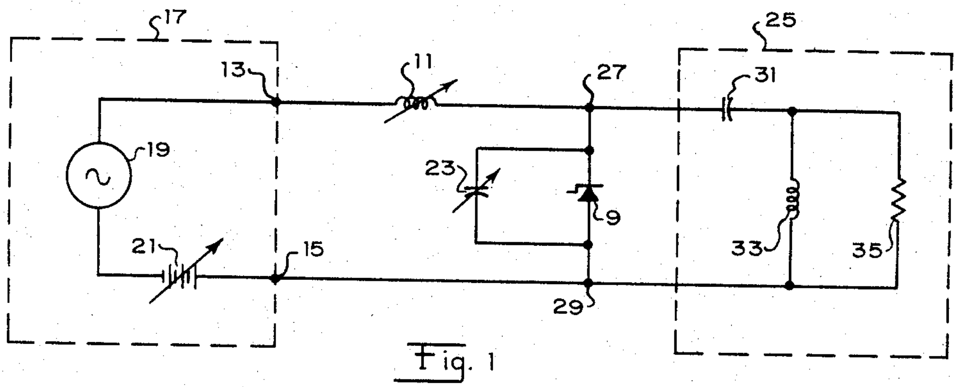
FIGURE 1 is a schematic diagram of the circuit of the present invention showing a utilization circuit including lumped reactive and resistive circuit elements.

Referring to FIGURE 1, there is shown a step recovery diode 9 and an inductor 11 serially connected between drive terminals 13, 15 to which is connected the driving circuit 17 including serially connected source 19 of periodic signals and source 21 of bias signal. Capacitor 23 and utilization circuit 25 are connected across the terminals 27, 29 of step recovery diode 9. The utilization circuit 25 may include capacitor 31 in series with the shunt combination of an inductor 33 and resistor 35 where, for example, the circuit is to operate as a harmonic generator.

Figure 3:
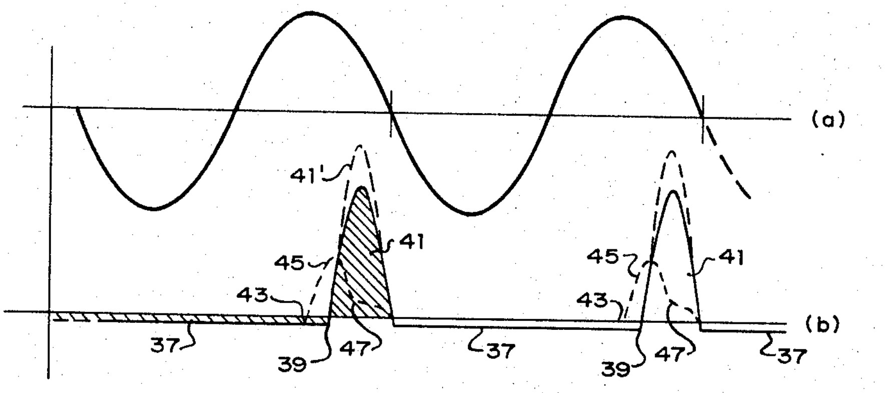
FIGURE 3 is a graph of signal wave forms present at various points in the circuit of FIGURE 1.

In operation, a periodic excitation signal, as shown in FIGURE 3*a*, from source 19 is applied through inductor 11 to the step recovery diode 9. A low forward conduction voltage drop 37 of FIGURE 3*b* will appear across the diode during forward conduction. The high conductivity shunt path through the forward biased diode 9 provides isolation between the input and output circuitry. Substantially the entire signal level appears across inductor 11 during forward conduction of the diode as the inductor 11 stores signal energy in its magnetic field. The diode 9 stores carriers in the immediate vicinity of its junction during forward conduction and then continues to conduct in the reverse direction until the supply of stored carriers is depleted. The diode 9 then suddenly and abruptly changes conductivity at an instant 39 during reverse conductivity of current in response to the sudden depletion of stored carriers about its junction. This permits energy to be transferred from the magnetic field about inductor 11 to the output circuit 25. The energy is transferred from inductor 11 to circuit 25 in a time approximately equal to one-half the natural resonant period of inductor 11 and capacitor 23. The natural period of circuit 25 should be greater than or equal to the period of the driving circuit 17 for high efficiency operation.

After the period of low diode conductivity during which a high energy pulse 41 is supplied to the output circuit 25, the excitation signal from source 19 immediately reestablishes and sustains forward conduction through the diode. The energy is thus confined to the output circuit 25 and is prevented from transferring back into the input circuit 17. This results in high efficiency conversion of applied signal to a signal having the frequency of resonance of the capacitance 31 and inductance 33 in the output circuit 25. For maximum frequency conversion efficiency when operated as a harmonic generator, it can be shown that capacitor 31 approximately equals the total capacitance 23 and inductor 33 approximately equals the total inductance 11 where capacitor 31—inductor 33 and capacitance 23—inductance 11 are selected to resonate at the desired output frequency.

Figure 2:
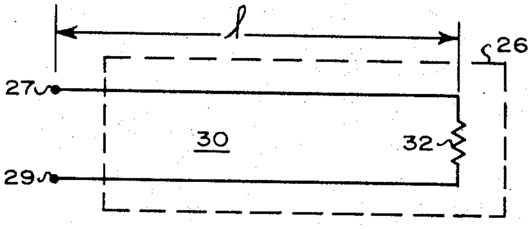
FIGURE 2 is a schematic diagram of another utilization circuit including distributed reactive elements in the form of a transmission line.

The circuit of FIGURE 1 may also be operated as a pulse generator with the output circuit 25 replaced between terminals 27 and 29 by the output circuit 26 of FIGURE 2. This circuit operates substantially as previously described with the step recovery diode 9 operating in the reverse biased state only during a short controlled portion of the total period of the excitation signal from source 19. A mismatch of the load resistance 32 and the characteristic impedance of the line 30 may be desirable where sustained wave oscillations along the line 30 are desirable. In this case, the length $l$ of transmission line 30 of output circuit 26 is chosen to have a two-way propagation time which is longer than the time of operation of the diode 9 in the reverse bias condition. This prevents energy from transferring back into the input circuit as a result of wave reflections emanating from a mismatch of the load resistor 32 with the characteristic impedance of the line 30.

For generating impulses, the load resistance 32 is chosen equal to the characteristic impedance of transmission line 30. The pulse generating circuit is thus loaded at terminals 27, 29 by the value of load resistance 32. The width of the pulse generated by the circuit operating into matched and mismatched loads is approximately equal to the half period of inductor 11 and capacitor 23. The characteristic impedance of the line alters the pulse width from the half period value in both cases provided that in the mismatch case where the characteristic impedance of the line and load resistance are not equal, the two-way pulse transmission time exceeds the half period value.

In each of the aforementioned circuit configurations and applications, the portion of the circuit to diode terminals 27 and 29 including the inductor 11 and input circuit 17 operates as an impulse generating circuit when the signal amplitude and bias levels are properly chosen. With bias source 21 set to zero, the average D.C. signal across the diode terminals 27, 29 must also be zero. Thus, the area under the curve 37 of forward voltage drop across diode 9 must equal the area under the curve of pulse 41. It can be seen empirically that the amplitude of the pulses 41 will not change materially with changes in excitation signal amplitude since the forward voltage drop across the diode remains substantially constant, typically at about .7 volt, but that the pulse amplitude will change with frequency of the excitation signal from source 19 and with bias from source 21. This is because the area under curve 37 is totaled over a shorter time for increased frequency and hence, for a given pulse width, the amplitude of pulse 41 must decrease with increased excitation frequency to maintain zero D.C. average signal across diode 9. Also, with the bias source set to some nonzero value, the average total area under curves 37 and 41 must equal such bias value. Thus since the area under the curve 37 over a given excitation signal period remains constant, the amplitude of pulse 41′ for a given pulse width increases as the bias signal from source 21 increases.

The amplitude of the excitation signal from source 19 must be sufficiently large so that the pulse across step recovery diode 9 during reverse bias operation terminates at an instant in the excitation signal cycle at which sustained forward bias is immediately restored. If the amplitude of the excitation signal is too small, an inadequate supply of carriers is stored in the vicinity of the junction of diode 9. The diode then recovers at an earlier time 43 during the excitation signal cycle to produce a pulse 45 across its terminals which is low in amplitude and which terminates 47 during the reverse biasing portion of the excitation signal cycle so that sustained forward bias is not immediately restored. This provides a lower energy pulse for transfer to a load circuit and further permits transfer of energy from the load circuit back into the input circuit during the sustained reverse bias time with a concomitant reduction in operating efficiency.

Therefore, the circuit of the present invention includes a step recovery diode which operates to produce high energy pulses when driven by a signal which maintains the diode in the forward conduction state for substantially the entire period of the driving signal and which restores sustained forward conduction bias to the diode immediately after termination of the generated pulse. Also the present invention provides unidirectional transfer of high energy pulses to a utilization circuit such as a harmonic generating circuit to provide high efficiency frequency conversion.

We claim:

1. An energy transfer circuit comprising:

a step recovery semiconductor diode which is capable of storing carriers in the immediate vicinity of the junction thereof during forward conduction and which is capable of sustaining conduction in the reverse direction in the presence of stored carriers;

a utilization circuit coupled to receive signal appearing across said diode;

a source of excitation signal;

inductive means;

circuit means including said source and said inductive means connected to said diode for supplying excitation signal thereto to maintain said diode conductive during substantially the entire period of the excitation signal;

said diode showing an abrupt decrease in conductivity during reverse-biasing portion of said excitation signal in response to sudden depletion of stored carriers in said diode for transferring energy stored in said inductive means to said utilization circuit during approximately one-half period of the natural operating frequency of circuitry coupled to said diode; and said circuit means restoring forward conduction through said diode immediately following said one-half period of said natural operating frequency.

2. A circuit as in claim 1 wherein said utilization circuit includes a transmission line having a load connected at one end of said line and having a two-way wave propagation time that is greater than the period of decreased conductivity operation of the diode.

3. A circuit as in claim 1 wherein said utilization circuit includes a resonant structure coupled to receive the signal appearing across the diode, the structure having a resonant frequency which is higher than the frequency of the excitation signal.

4. A circuit as in claim 3 wherein the resonant structure includes inductance and capacitance, the value of the inductance equals the value of the inductive means and the value of said capacitance equals the total capacitance shunting said diode.

References Cited

UNITED STATES PATENTS

| | | | |
|---|---|---|---|
| 2,964,637 | 12/1960 | Keizer | 250—211 |
| 3,170,069 | 2/1965 | Kaenel | 307—88 |
| 3,292,006 | 12/1966 | Candy et al. | 333—83 X |
| 3,299,294 | 1/1967 | Koehler | 307—88.5 |
| 3,307,117 | 2/1967 | Williams | 331—42 |

FOREIGN PATENTS

| | | |
|---|---|---|
| 1,185,404 | 2/1959 | France. |

OTHER REFERENCES

"P-N Junction Charge-Storage Diodes," by Mull et al., Proceedings of IRE, January 1962; pages 43–51 relied upon.

"Harmonic Generators: Is the Step Recovery Diode Best?" by Hall; Electrical Design, January 1965; pages 28–33 relied upon.

JOHN F. COUCH, *Primary Examiner.*

G. GOLDBERG, *Assistant Examiner.*